May 15, 1945.  C. R. SACCHINI  2,376,011
WINDSHIELD WIPER UNIT
Filed Oct. 29, 1942
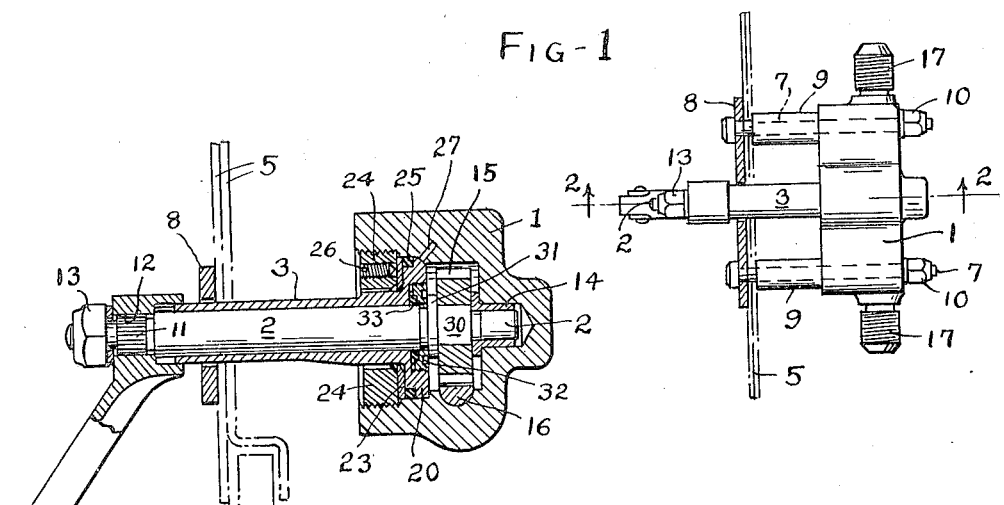
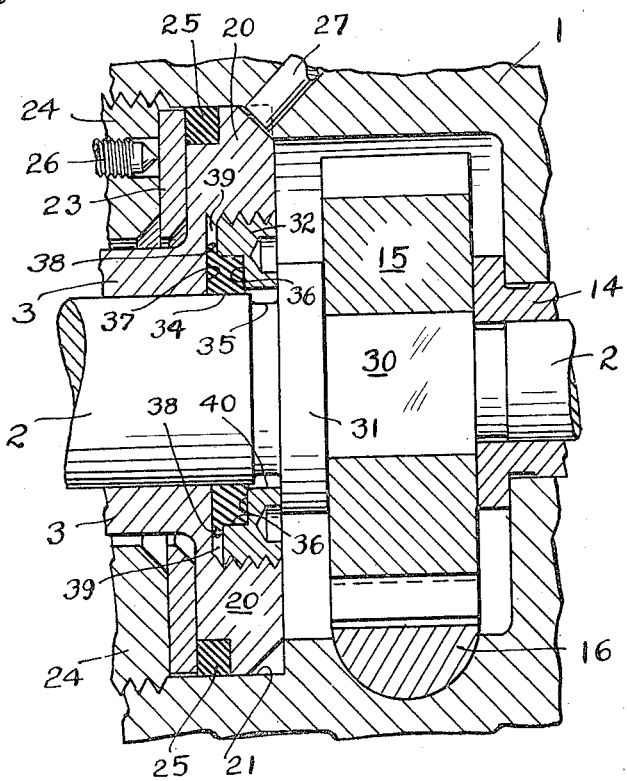
INVENTOR
COLUMBUS R. SACCHINI
BY George M. Soule
ATTORNEY Patented May 15, 1945

2,376,011

UNITED STATES PATENT OFFICE 2,376,011

WINDSHIELD WIPER UNIT

Columbus R. Sacchini, Euclid, Ohio, assignor to The Marquette Metal Products Company, Cleveland, Ohio, a corporation of Ohio Application October 29, 1942, Serial No. 463,745

5 Claims. (Cl. 15—253)

This invention relates to an improvement in windshield wiper window units of the type used on aircraft and other vehicles, and, more specifically, to an improved means for sealing a wiper arm driving shaft against leakage of oil therealong to a point such that the oil could reach the outer windshield surface and obscure or partially obscure regions thereof and impair clear vision therethrough. The above indicates the general object.

A further object is to provide an efficient window unit shaft seal for a design of window unit mechanism such as shown herewith, which seal does not require enlargement of the mechanism as a whole or special expensive machining or fitting operations on any of the parts and does not complicate the operation of assembling the various parts.

Another object is to provide a novel self-contained bearing tube and seal sub-assembly for a windshield wiper driving mechanism unit, which sub-assembly is arranged to prevent loss of oil along either outside or inside surfaces of the tube in the mounted position thereof in a main housing and when supporting a wiper arm driving shaft which projects from the housing.

Another object is to provide a window unit shaft seal in which an assembly comprising an elastic sealing element and retaining means therefore is of self-locking character so that accidental displacement of seal parts and resultant deleterious effects on other parts of the mechanism is simply but effectively prevented.

Other objects and various novel features of the invention will become apparent from the following description of the preferred form shown in the drawing, wherein:

Fig. 1 is a plan view of a window unit representative of the kind of mechanism to which the invention is applicable; Fig. 2 is a central sectional elevational view of the mechanism and wiper taken along the line 2—2 on Fig. 1; and Fig. 3 is an enlarged fragmentary view similar to Fig. 2 showing the seal and immediately adjacent elements of the window unit.

Ordinarily, in units of the type shown herewith, a hollow fluid-tight body or housing I contains driving mechanism for oscillating a wiper arm shaft 2 having suitable bearings in the housing and the shaft and part (tube 3) of the bearing means therefor extends through the vehicle body wall (ship's skin in case of aircraft) so as to support a wiper arm such as 4 for movement over the portion of the windshield surface which it is desired to keep clear. Oil from the mechanism has to be blocked against exuding from between the shaft and tubular bearing and becoming smeared upon the windshield. The usual method of blocking such outward travel of oil is to provide a sealing ring and joint between the outer end of the bearing tube such as 3 and the adjacent portion of the shaft such as 2; and the common method of supporting a sealing ring in such case was to mount it in a recess on the back side of an outer attaching plate for the window unit as a whole. The sealing force was determined by the relationship of the cap to the end of the tubular bearing but the actual position between those parts frequently had to be determined in part by the thickness of the ship's skin or other wall which supported the window unit; and it was difficult to hold the dimensions of the unit in any close limit relationship to such wall or ship's skin in view of variations in thickness of the latter. When the proper amount of compression on the sealing ring was not maintained then the seal either leaked or wore out rapidly due mainly to friction or excess pressure and resulting heat.

My solution to the problem of sealing the wiper arm shaft is to insert a sealing ring inside the shaft housing, thereby to prevent movement of any oil, except such as might be necessary for effective lubrication, to any part of the shaft outwardly from the seal toward the external surface of the ship. I have found that enough oil film remains on the shaft for lubrication but nevertheless there is no leakage and consequent obscurement of the windshield. Moreover, the sealing ring itself in my present arrangement serves in part, as a bearing, in cooperation with an inner positive bearing already provided for the shaft, so that all the usual outer bearing (tube) has to do is serve as a guide and protective housing for the portion of the shaft which extends outside the ship. The sealing arrangement has been found highly effective at fairly high oscillation speed on part of the wiper arm and when the shaft and bearing tube are subjected both to low and to unusually high fluid pressures.

Referring further to the window unit, Fig. 1 shows one manner of attaching the housing I to the members 5 comprising ship's skin sheets framing a transparent windshield panel 6. As shown, attaching bolts 7 pass through an attaching plate or escutcheon 8, the sheets 5, respective spacer sleeves 9 and the housing I, being secured by nuts 10 abutting said housing. The wiper arm may include a head section adjustably fixed to the outer end of the shaft 2; as through complementary serrations or flutes 11—12 on the shaft and head section respectively and a clamping nut 13. The head section may be counterbored to telescope the outer end of the bearing tube 3 a short distance as a guard and moisture-excluding joint.

The shaft 2, inside the housing, has a bearing 14 and, between that and the bearing tube 3, a suitable driving means connects with the shaft. As shown, the shaft carries a pinion 15 drivingly rigid with the shaft and in constant mesh with teeth of a rack bar 16 slidably mounted in the housing 1 and adapted to be reciprocated by a remote prime mover or other power means through flexible torque shafting not shown. Adapters for coupling elements of the shafting are connected at the externally threaded housing extensions 17. The rack bar may, instead, be operated as or by a hydraulic plunger in which case the problem of sealing the housing around the shaft 2 against leakage along the shaft would ordinarily be more difficult due to the higher fluid pressures used.

The bearing tube 3, in the particular form illustrated, is a separate part of the housing 1 (may be integral therewith in some cases) and the tube 3 has a flange 20 (see Fig. 3) fixed inside the housing in a circular recess 21 thereof. An annular seal-retaining plate 23 clamped by an annular nut 24, threaded into the housing, compresses a flexible elastic ring 25 into a substantially complementary recess formed by mutually adjacent wall portions of the housing, flange 20 and plate 23. The seal blocks fluid leakage from the housing 1 along the external surfaces of the bearing tube. A pointed grub screw 26 in the nut 24 bears on the sealing plate 23 to prevent the plate from turning. The bearing tube can be locked into place against turning as by a diagonally or obliquely extending fixed pin 27 adapted to engage one of a number of circumferentially spaced notches in the adjacent corner portion of the flange 20 which corner appears as though it were completely beveled.

The drive shaft 2 adjacent the (e. g. squared) portion 30 thereof (for driving key connection with the pinion 15) is enlarged or shouldered at 31 in order to prevent movement of the pinion out of proper position (to the left) with reference to the rack 16. The enlargement 31 of the shaft would ordinarily accomplish said purpose by abutting the flange 20 of the bearing tube, but in the present construction the enlargement is positioned to move slightly axially and then abut an annular nut 32 which forms the clamping and retaining element for an elastic compressible sealing ring 33, bearing at its inner peripheral surface 34 on a smooth cylindrical surface of the shaft 2 lying outwardly beyond the enlargement or shoulder 31 and an adjacent conventional groove or undercut 35.

The elastic sealing ring 33 (before insertion and assembly into the position shown) is an annulus which is flat on both sides and simply cylindrical inside and outside. Preferably the ring 33 is Neoprene or other suitable, oil-resisting synthetic rubber, either accurately molded or cut to proper size. The ring may be cut from sheet stock. The hole 34 in the ring 33 is slightly undersize with reference to the shaft and also (when uncompressed) the width (axially) is slightly less than the space provided for the ring between the bottom of the groove 36 of the nut and the bottom 37 of the threaded opening in which the nut is seated. When made for a $\frac{7}{16}''$ shaft the distance the elastic ring has to be compressed axially may be, for example, from .0015'' to .005'' and for larger shafts the distance would be greater. The ring is made in outside diameter so as to slip easily into the groove or recess 36 of the nut 32. Before insertion the ring is soaked in oil for several minutes to prevent subsequent galling such as would occur from running dry on the shaft under pressure adequate to effect sealing against high fluid pressures.

The nut 32 is made very accurately as to length and provided with conventional spanner wrench holes so that the nut does not have to project toward the pinion 15 beyond the near face of the flange 20. When the nut 32, in which the sealing ring 33 has been placed, is in threaded engagement with the bearing tube, the nut is then jammed down tightly against the sealing ring. Thereupon an unconfined peripheral portion of the ring, at 38, is extruded into the space 39 between the nut and the bottom of the threaded recess, but the extrusion is limited to a small amount partly by the tensile strength of the Neoprene and partly by the wedging or pinching action thereon by the nut. The extruded flange 38 on the elastic ring acts as a lock washer on the nut; insures that the ring itself will not turn, and effects a positive sealing against escape of oil from along the thread spaces around the nut 32. The sealing force of the elastic ring 33 against the shaft is maintained partly by the endwise compression on the ring and partly by the undersized relationship of the hole 34 in respect to the shaft, already mentioned. There is enough oil film supplied as leakage past the seal for lubricating the shaft in the portion of the bearing tube lying outwardly beyond the seal (to the left).

In assembling the various parts the preferred procedure is as follows: The ring 32, having been soaked in oil as mentioned, is inserted into the recess 36 of the nut and the nut is then jammed into place as already described. The shaft with the pinion thereon is then inserted into the housing 1 (to position shown); and the assembled bearing tube and shaft seal is then slid over the free end of the shaft. To assist in expanding the sealing ring 33 over the shaft, a bullet-nosed guide thimble (not shown) is temporarily placed on the threaded outer end of the shaft. When the flange 20 of the bearing tube (with sealing ring 25 thereon) is in place in the housing 1 the retaining plate 23, nut 24, etc. are then positioned and secured as already described and the assembled window unit mechanism is then ready to be mounted on the vehicle.

In the mechanism shown, the shaft 2 is intended to be oscillated as much as 200 cycles per minute. It has successfully withstood 800 pounds per square inch operating pressure continuously for eighteen hours without exhibiting any sign of leakage and 1000 pounds per square inch static pressure for about the same time without leaking. Only a small area of the seal is actually exposed to such high pressures, namely, the ring face area between the central hole 40 of the nut 32 and the radially adjacent unreduced portion of the shaft 2 which unreduced portion, as shown in Fig. 3, extends a slight distance inwardly past the seal into said hole 40.

The specific window unit mechanism shown is mainly by way of example. The unit may have a self-contained motor and/or a different gearing (e. g. for unidirectionally rotating the wiper arm shaft instead of oscillating it) or the unit may constitute a completely hydraulically operable mechanism.

I claim:

1. In a window unit for a windshield wiper mechanism, in combination, a housing adapted to contain fluid under pressure, a wiper arm drive shaft extending therefrom in a tubular bearing portion of the housing, a wiper arm on the outer end of the shaft beyond the bearing, and an elastic fluid-sealing ring between the inner end of the tubular bearing and the shaft peripherally embracing the shaft, and means carried by said inner end of the bearing and compressing the ring radially and axially to hold the inner periphery of the ring in snug sealing contact with the shaft.

2. In a window unit for a windshield wiper mechanism, in combination, a generally fluid-tight housing, a bearing tube removably secured in closing relation to an opening in one wall of the housing, a shaft coaxial with the tube and supported thereby, a circular flange on the inner end of the tube, annular resilient sealing means between the outer peripheral portion of the flange and a radially opposite surface portion of the housing wall around said opening, and an annular synthetic rubber sealing ring between an inner peripheral surface portion of the flange and the shaft, slidably bearing on the shaft peripherally thereof and maintained in pressure contact therewith.

3. In a windshield wiper mechanism including a generally fluid-tight housing, a tubular bearing projecting therefrom and a rotary shaft extending from within the housing through the bearing, a threaded circular recess around a cylindrical portion of the shaft and in the inner end of the bearing, an annular threaded nut seated in the recess and having an annular circular recess facing opposite the threaded recess axially of the shaft, and a normally flat cylindrical elastic compressible ring in snug peripheral sealing contact with the shaft and having an outer corner portion extruded into a flange by axial pressure of the nut and clamped thereby into annularly continuous face-to-face sealing contact with the bottom of the threaded recess of the bearing.

4. In a mechanism of the class described, a generally fluid-tight housing, driving mechanism within the housing, a power take-off shaft connected with the driving mechanism and extending out of the housing, a flange on the shaft inside the housing to limit outward movement of the shaft, an annular nut threaded to a portion of the housing around the shaft in close proximity thereto and in position for axial abutment by the flange of the shaft, the housing and nut being relatively recessed to form a generally cylindrical annular cavity around the shaft, and an elastic compressible sealing ring in the cavity maintained by the nut in snug peripherally continuous fluid-sealing contact with the shaft and fluid-sealing contact with an end wall of the recess opposite the nut.

5. The mechanism according to claim 4 wherein the annular recess is formed in an outer end face of the annular nut and said face pinches an extruded flange portion of the elastic ring against the housing continuously around the shaft.

COLUMBUS R. SACCHINI.